United States Patent [19]

Metz

[11] Patent Number: 5,430,374

[45] Date of Patent: Jul. 4, 1995

[54] POSITION MEASURING SYSTEM USING TWO GROUPS OF MAGNETORESISTORS SPACED DIFFERENTLY

[75] Inventor: Gerald Metz, St. Georgen, Germany

[73] Assignee: Dr. Johannes Heidenhain GmbH, Traunreut, Germany

[21] Appl. No.: 239,043

[22] Filed: May 6, 1994

[30] Foreign Application Priority Data

May 14, 1993 [DE] Germany .................. 43 16 221.5

[51] Int. Cl.⁶ .................. G01B 7/14; G01R 33/02; H03K 17/90; H03K 19/18
[52] U.S. Cl. .................. 324/207.21; 324/207.24; 338/32 R
[58] Field of Search .................. 324/207.21, 207.24, 324/207.25, 207.13, 252; 338/32 R; 327/510

[56] References Cited

U.S. PATENT DOCUMENTS

| 4,806,860 | 2/1989 | Iijima et al. . |
| 5,036,276 | 7/1991 | Aizawa . |
| 5,243,280 | 9/1993 | Kusumi . |

FOREIGN PATENT DOCUMENTS

| 0151002 | 8/1985 | European Pat. Off. . |
| 0493260 | 7/1992 | European Pat. Off. . |
| 3719328 | 12/1987 | Germany . |
| 4208927 | 9/1992 | Germany . |
| 61-84504 | 4/1986 | Japan . |

OTHER PUBLICATIONS

Patent Abstracts of Japan, P-493, vol. 10/No. 256, Sep. 2, 1986.

Primary Examiner—Walter E. Snow
Attorney, Agent, or Firm—Willian Brinks Hofer Gilson & Lione

[57] ABSTRACT

In a position measuring system a period graduation is scanned by a scanning unit using two groups of respectively four magneto-resistive elements. To avoid crossings of the connecting strip conductors of the magneto-resistive elements and short-wave interference effects on the measuring accuracy, the magneto-resistive elements of the first group extend over one index period of the graduation at a mutual separation of t/4, while every magneto-resistive element of the second group is disposed in adjoining index periods of the graduation at a mutual separation of ¾(t). Starting at the center of both groups, the respectively Nth magneto-resistive element of the first group is connected to the Nth magneto-resistive element of the second group free of crossings.

20 Claims, 13 Drawing Sheets

POSITION MEASURING SYSTEM USING TWO GROUPS OF MAGNETORESISTORS SPACED DIFFERENTLY

FIELD OF THE INVENTION

The invention relates to a position measuring system for measuring the relative position of two objects which are movable with respect to each other, wherein a periodic graduation is scanned by magneto-resistive elements forming part of a scanning unit to generate position-dependent output signals from which position measuring values for the relative positions of the two objects are formed in an evaluation device.

BACKGROUND OF THE INVENTION

A position measuring system of this type is used particularly in processing machines for measuring the relative positions of a tool with respect to a workpiece to be processed.

European Patent Publication EP-0 151 002 B1 describes a magnetic position measuring system for measuring the relative position of two objects which are movable with respect to each other. A periodic graduation is scanned by a scanning unit having two groups of magneto-resistive elements, each group having four magneto-resistive elements, for generating zero-symmetrical output signals as shown in FIG. 19. The magneto-resistive elements of the two groups having output signals with phase relations of 0° and 180° are connected in series to form a first half-bridge circuit and the magneto-resistive elements of the two groups having output signals with phase relations of 90° and 270° are connected in series to form a second half-bridge circuit. Two zero-symmetrical output signals with a mutual phase shift of 90° are present at the center taps of the two half-bridge circuits for obtaining position measurement values in a downstream evaluation device. This position measuring system has the disadvantage that the physical layout of the magneto-resistive elements requires the connecting strip conductors of the magneto-resistive elements to repeatedly cross over each other thereby making it necessary to provide an insulating layer between the crossing connecting strip conductors. The required tempering of the insulating layer causes an increase in the hysteresis of the two zero-symmetrical output signals. This additional provision of the insulating layer and the cross-over layer makes the scanning unit more expensive and complicated to manufacture and can lead to an increase of rejected devices during manufacture.

A similar magnetic position measuring system is described in German Patent DE-PS 37 19 328 wherein a periodic graduation is scanned by a scanning unit having four groups of magneto-resistive elements, each group having four magneto-resistive elements, for generating zero-symmetrical output signals as shown in FIG. 2a. To avoid crossing of the connecting strip conductors, the four magneto-resistive elements of each group are no longer disposed together within one index period of the graduation. Instead, there is a distance in the direction of measurement of more than five index periods between the magneto-resistive element with the output signal of the phase relation of 0° and the magneto-resistive element with the output signal of the phase relation of 180° (push-pull elements), as well as between the magneto-resistive element with the output signal of the phase relation of 90° and the magneto-resistive element with the output signal of the phase relation of 270° (push-pull elements) of the same group. It is therefore only possible to filter out interference effects which extend over more than five index periods, because in this case the interference effects influence the related push-pull elements in the same way. On the other hand, short-wave interference effects of less than five index periods have a disadvantageous effect on the accuracy of measurement.

SUMMARY OF THE INVENTION

According to a first aspect, a position measuring system for measuring the relative position of a first object with respect to a second object is provided. A periodic graduation having an index period of t is located on the first object. A scanning unit for scanning the periodic graduation is located on the second object. The scanning unit includes a first base arrangement facing the periodic graduation. The base arrangement includes a first group of at least four magneto-resistive elements, the first group spanning a distance no greater than the index period of the graduation, and a second group of a least four magneto-resistive elements located adjacent to the first group, the second group spanning a distance greater than the index period of the graduation. The first and second groups being separated by a predetermined distance so that a center point exists between two groups. A plurality of conductors for connecting elements of the first groups to elements of the second group without crossing the conductors wherein the Nth element of the first group is directly connected to the Nth element of the second group where N represents the number element of the first and second groups from the center point.

It is an object of the invention to recite, in connection with a position measuring system of the e species mentioned, an arrangement of magneto-resistive elements wherein the crossing of connecting strip conductors is avoided or minimized and short-wave interference effects have little or no consequence on measuring accuracy.

By avoiding or minimizing the amount of crossings of the connecting strip conductors through the arrangement of the magneto-resistive elements, the construction of the scanning unit is simplified and the cost of construction is reduced. In addition, hysteresis-free output signals can be generated. Furthermore, short-wave interference effects on the signal parameters of the output signals obtained are effectively compensated so that the accuracy of measurement and measuring discrimination are further increased.

The invention itself, together with objects and attendant advantages, will best be understood by reference to the following detailed description taken in conjunction with accompanying drawings. It should be understood, however, that this description is to be illustrative rather than limiting, the scope of the invention being defined by the appended claims and equivalents thereof.

BRIEF DESCRIPTION OF THE DRAWINGS

FIG. 2b is a circuit diagram of the arrangement shown in FIG. 2a.

FIG. 3b is a circuit diagram of the arrangement shown in FIG. 3a.

DETAILED DESCRIPTION OF THE PRESENTLY PREFERRED EMBODIMENTS

Figure 1:
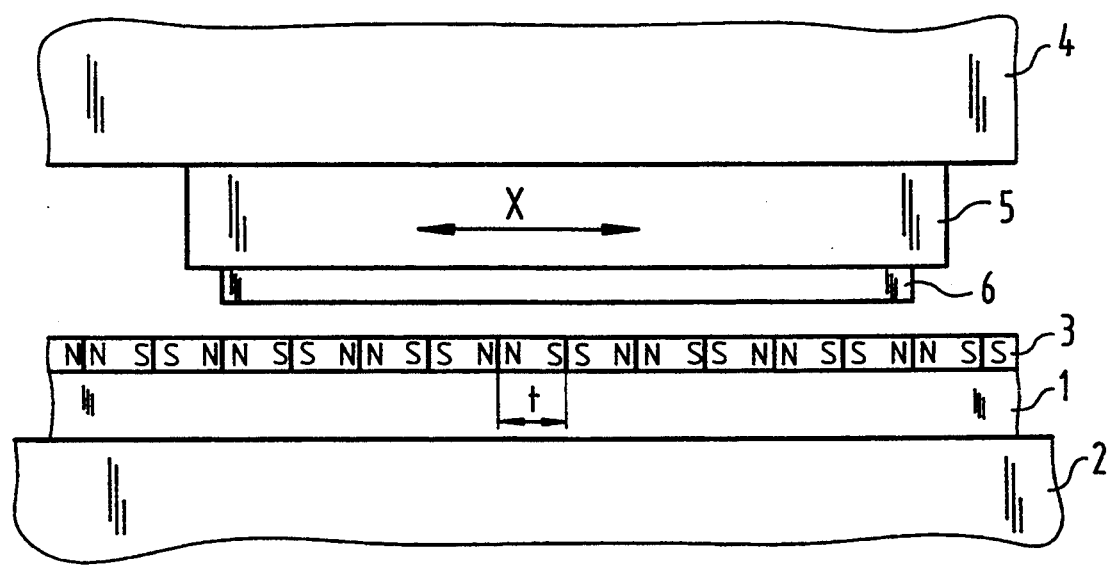
FIG. 1 illustrates a perspective view of a position measuring system according to a preferred embodiment of the present invention.

FIG. 1 illustrates a perspective view of a position measuring system according to a preferred embodiment of the present invention. The measuring system includes a measurement representation 1 fastened to a first object 2. Preferably the measurement representation 1 is formed of a magnetizable material. On the surface of the measurement representation a magnetic-pattern is recorded in the direction of displacement X. The magnetic-pattern recorded on the measurement representation 1 forms a periodic graduation 3 having a series of magnetized areas, each area having an N pole and an S pole. The poles of the magnetized areas are arranged so that the S pole of one area abuts the S pole of an adjacent area and the N pole of an area abuts the N pole of another adjacent area as illustrated. The index period t of the periodic graduation 3 is defined by the pole distance of each area NS.

A scanning unit 5 is connected to a second object 4. The first and second objects, 2 and 4 respectively, are movable with respect to one another. In a preferred embodiment, the first and second objects 2 and 4 may be two machine parts of a processing device (not shown). The scanning unit 5 on the second object 4 scans the graduation 3 on the first object 2 to generate position-dependent output signals. An evaluation unit (not shown) generates position measurement values for the relative position of the first and second objects from the position-dependent output signals.

The scanning unit 5 includes a scanning plate 6. Two groups of magneto-resistive elements (not shown) are disposed on the surface of the scanning plate 6 facing the periodic graduation 3 to form a base arrangement. Various arrangements of the magneto-resistive elements will be described in detail with reference to FIGS. 2a–h and 3a–f.

Figure 2A:
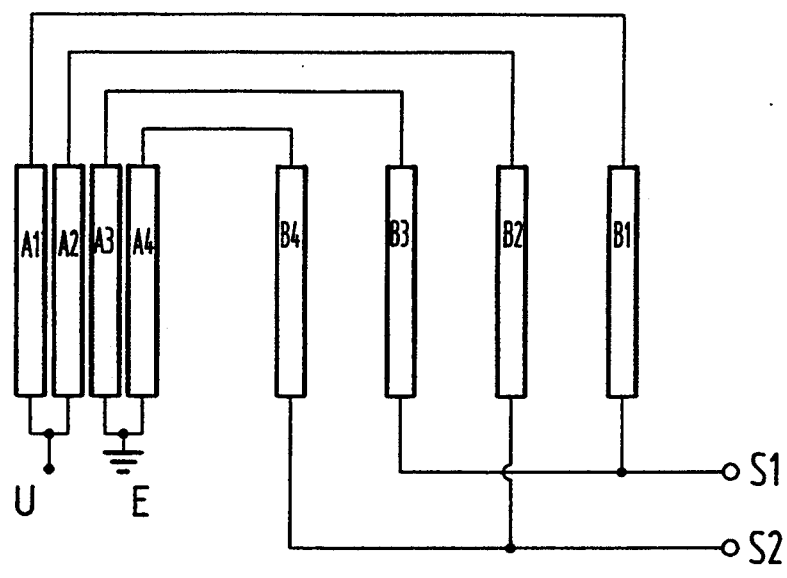
FIG. 2a illustrates the physical arrangement of a half-bridge circuit formed by two groups of magneto-resistive elements according to a first preferred embodiment.
Figure 2A:
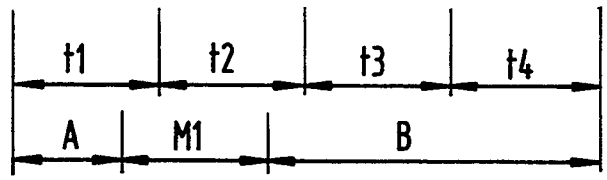

FIG. 2a illustrates the physical arrangement of a half-bridge circuit formed by two groups of magneto-resistive elements according to a first preferred embodiment. The two groups $A_n$ and $B_n$ form a base arrangement and are disposed parallel to each other in a plane parallel to the plane of the periodic graduation 3. In a preferred embodiment, the magneto-resistive elements $A_{1-4}$ and $B_{1-4}$ are strip shaped and extend in a direction perpendicular to the measuring direction X. The four magneto-resistive elements $A_{1-4}$ of the first group $A_n$ extend over a first index period $t_1$ of the graduation 3 and have a mutual phase shift of one quarter of the first index period. The index periods for this embodiment and all subsequently described embodiments are constant so that: $t_1=t_2=t_3=t_n=t$. Thus, the first magneto-resistive element $A_1$ with the output signal of the phase relation of 0° is disposed at the first position "0°", the second magneto-resistive element $A_2$ with the output signal of the phase relation of 90° is disposed at the second position "90°", the third magneto-resistive element $A_3$ with the output signal of the phase relation of 180° is disposed at the third position "180°" and the fourth magneto-resistive element $A_4$ with the output signal of the phase relation of 270° is located at the fourth position "270°" of the first index period $t_1$.

The four magneto-resistive elements $B_{1-4}$ of the second group $B_n$ are disposed in the adjoining index periods $t_2$, $t_3$, $t_4$ of the graduation 3. The mutual distance between each magneto-resistive elements $B_1$ to $B_4$ is $\frac{5}{4}(t)$. Starting at the center M1 of both groups A and B, the Nth magneto-resistive element $A_n$ of group A is directly electrically connected to the Nth magneto-resistive element $B_n$ of the other group B, i.e. series-connected. The index N corresponds to the continuous numbering of sequential elements starting at a reference point such as M1. Thus, with respect to FIG. 2a, the first (N=1) element of group A from the center M1, $A_4$ is connected to the first (N=1) element of group B from the center M1, $B_4$. The second (N=2) element of group A from the center M1, $A_3$, is connected to the second (N=2) element of group B from the center, $B_3$. The index n defines the phase relationship of the elements with respect to the graduation 3. For example, with n=1–4, the phase relation of 0° is defined by n=1, the phase relation of 90° by n=2, the phase relation of 180° by n=3, and the phase relation of 270° by n=4. With reference to FIG. 2a, the elements $A_n$ and $B_n$ connected to each other have the same phase relation with respect to the graduation. More particularly, the element $A_4$ with the phase relation of 270° is series-connected with the element $B_4$ with the phase relation of 270°, the element $A_3$ with the phase relation of 180° to the phase element $B_3$ with the phase relation of 180°, the element $A_2$ with the phase relation of 90° to the phase element $B_2$ with the phase relation of 90° and the element $A_1$ with the phase relation of 0° to the phase element $B_1$ with the phase relation of 0°. The center distance M1 separating the two groups A and B equals one index period t.

Figure 2B:
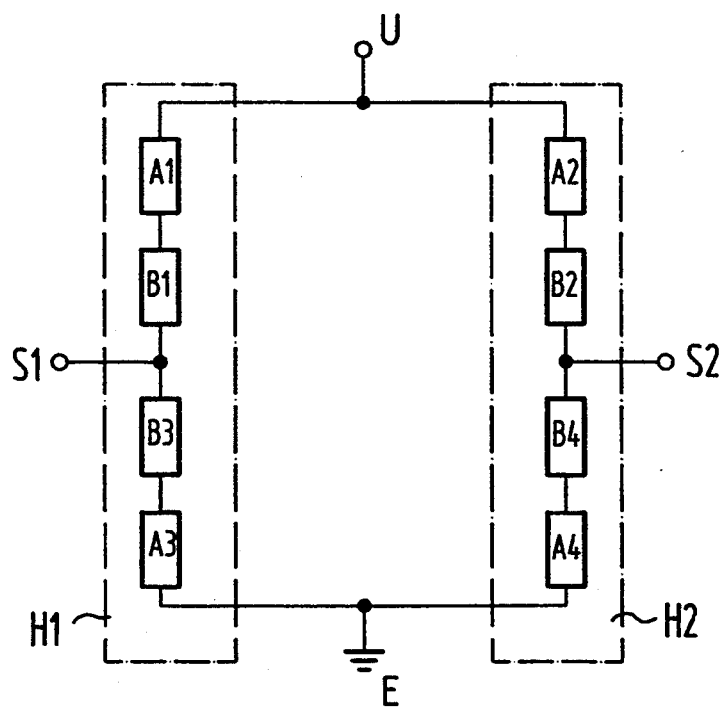

FIG. 2b is a circuit diagram of the arrangement shown in FIG. 2a. A first and a second half-bridge circuit H1 and H2 are formed. Magnetoresistive elements $A_1$ and $B_1$ are series-connected in the upper bridge arm and magneto-resistive elements $A_3$ and $B_3$ are series-connected in the lower bridge arm. The elements $A_1$ and $B_1$ have an output signal having a phase relation of 0° and elements $A_3$ and $B_3$ have a phase relation of 180°. The two magneto-resistive elements $A_2$ and $B_2$ are respectively series-connected with the output signals of the phase relation of 90° in the upper bridge arm, and the two magneto-resistive elements $A_4$ and $B_4$ with the output signals of the phase relation of 270° in the lower bridge arm of a second half bridge circuit H2. One pole of each half bridge circuit H1 and H2 is connected to a voltage U and the other pole to ground E, i.e. the half bridges are connected in parallel.

In the course of the measuring movement of the scanning unit 5 with respect to the graduation 3, a first zero-symmetrical output signal S1 with a phase relation of 0° appears at the center tap of the first half bridge circuit H1 and a second zero-symmetrical signal S2 with the phase relation of 90° appears at the center tap of the second half bridge circuit H2, their signal periods correspond to the index period t of the graduation 3. The phase difference of 90° between the two zero-symmetrical output signals S1 and S2 allows the discrimination of the measuring direction X. The two zero-symmetrical signals S1 and S2 are supplied to an evaluation unit (not shown) having an interpolation unit for obtaining position measuring values regarding the relative position of the two objects 2 and 4.

Figure 2C:
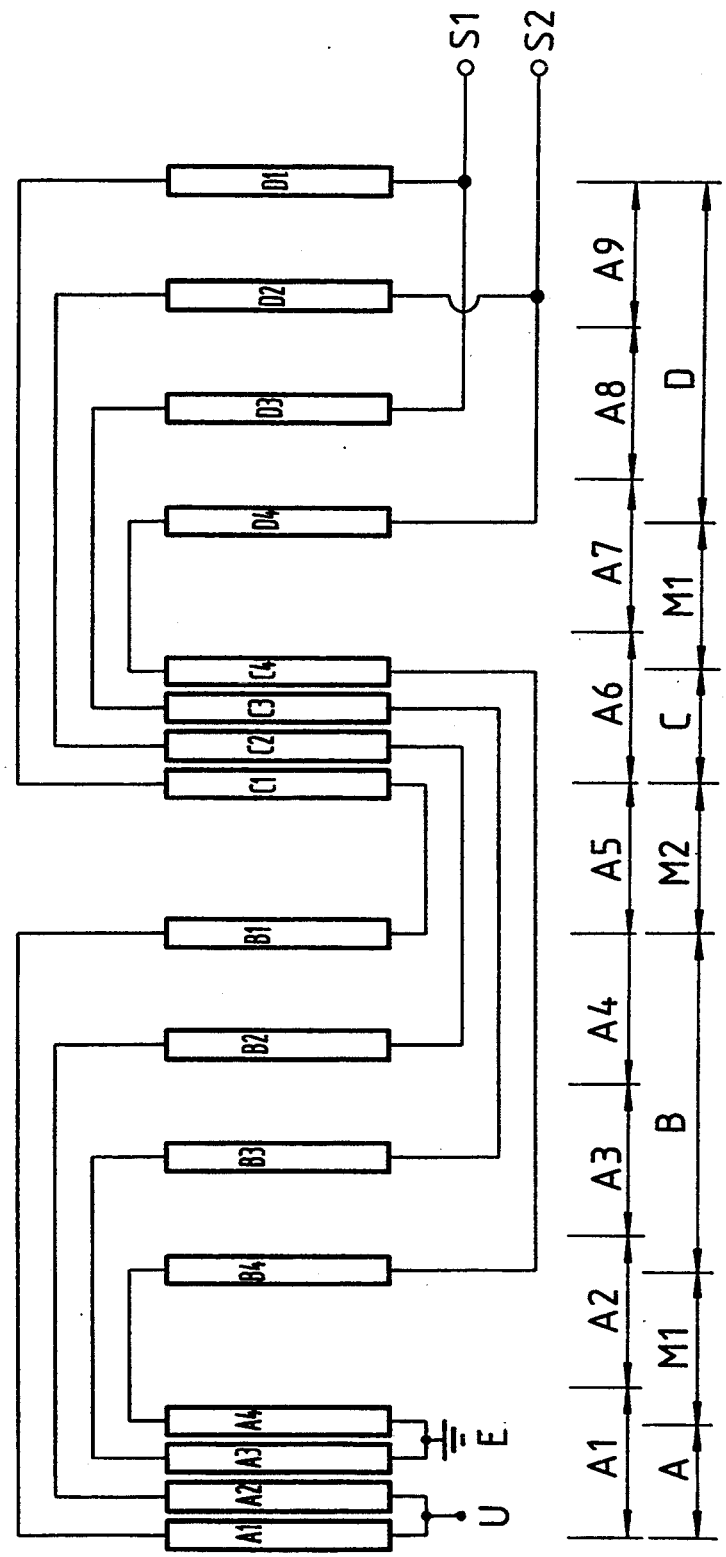
FIG. 2c illustrates the physical arrangement of a half-bridge circuit formed by four groups of magneto-resistive elements according to a second preferred embodiment.

FIG. 2c illustrates the physical arrangement of a half-bridge circuit formed by four groups of magneto-resistive elements according to a second preferred embodiment. The magneto-resistive arrangement shown in FIG. 2c is similar to that shown in FIG. 2a with the addition of a second base arrangement formed by two groups of magneto-resistive elements $C_{1-4}$ and $D_{1-4}$, each group having four magneto-resistive elements. The two base arrangements are series connected behind each other and have a mutual center distance M2 of one index period t. Each element $B_n$ of group B is series-connected with the equiphase element $C_n$ of group C. Because of the selected arrangement, these circuits are provided free of crossings.

Figure 2D:
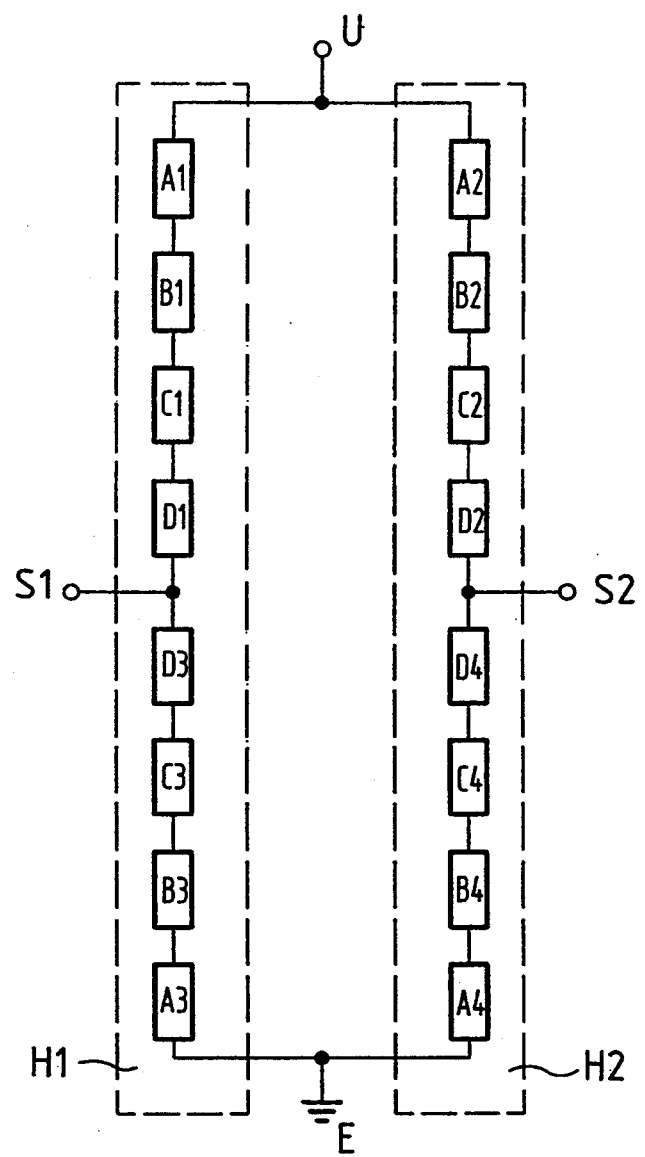
FIG. 2d is a circuit diagram of the arrangement shown in FIG. 2c.

FIG. 2d is a circuit diagram of the arrangement shown in FIG. 2c. This arrangement includes two half bridge circuits H1 and H2 each having an upper arm and a lower arm. The upper arm of half bridge circuit H2 includes magneto-resistive elements $A_1$, $B_1$, $C_1$, and $D_1$ and the lower arm includes elements $A_3$, $B_3$, $C_3$ and $D_3$. The output of the upper arm has a phase relation 0° and the lower arm has a phase relation 180°. The second half bridge circuit H2 also includes an upper arm and a lower arm. The upper arm includes magneto-resistive elements $A_2$, $B_2$, $C_2$ and $D_2$ while the lower arm includes elements $A_4$, $B_4$, $C_4$ and $D_4$. The output of the upper arm has a phase relation of 90° while the lower arm has a phase relation of 270°. One pole of each half bridge circuit H1 and H2 is connected to a voltage U and the other pole to ground E.

In the course of measuring the movement of the scanning unit 5 with respect to the graduation 3, a first zero-symmetrical signal S1 of the phase relation of 0° appears at the center tap of the first half bridge circuit H1 and a second zero-symmetrical signal S2 of the phase relation of 90° appears at the center tap of the second half bridge circuit H2, the signal periods of which correspond to the index period t of the graduation 3. The phase difference of 90° between the two zero-symmetrical output signals S1 and S2 allows the discrimination of the measuring direction X. The two zero-symmetrical signals S1 and S2 are supplied to an evaluation unit (not shown) having an interpolation unit for obtaining position measuring values regarding the relative position of the two objects 2 and 4 (see FIG. 1).

Figure 2E:
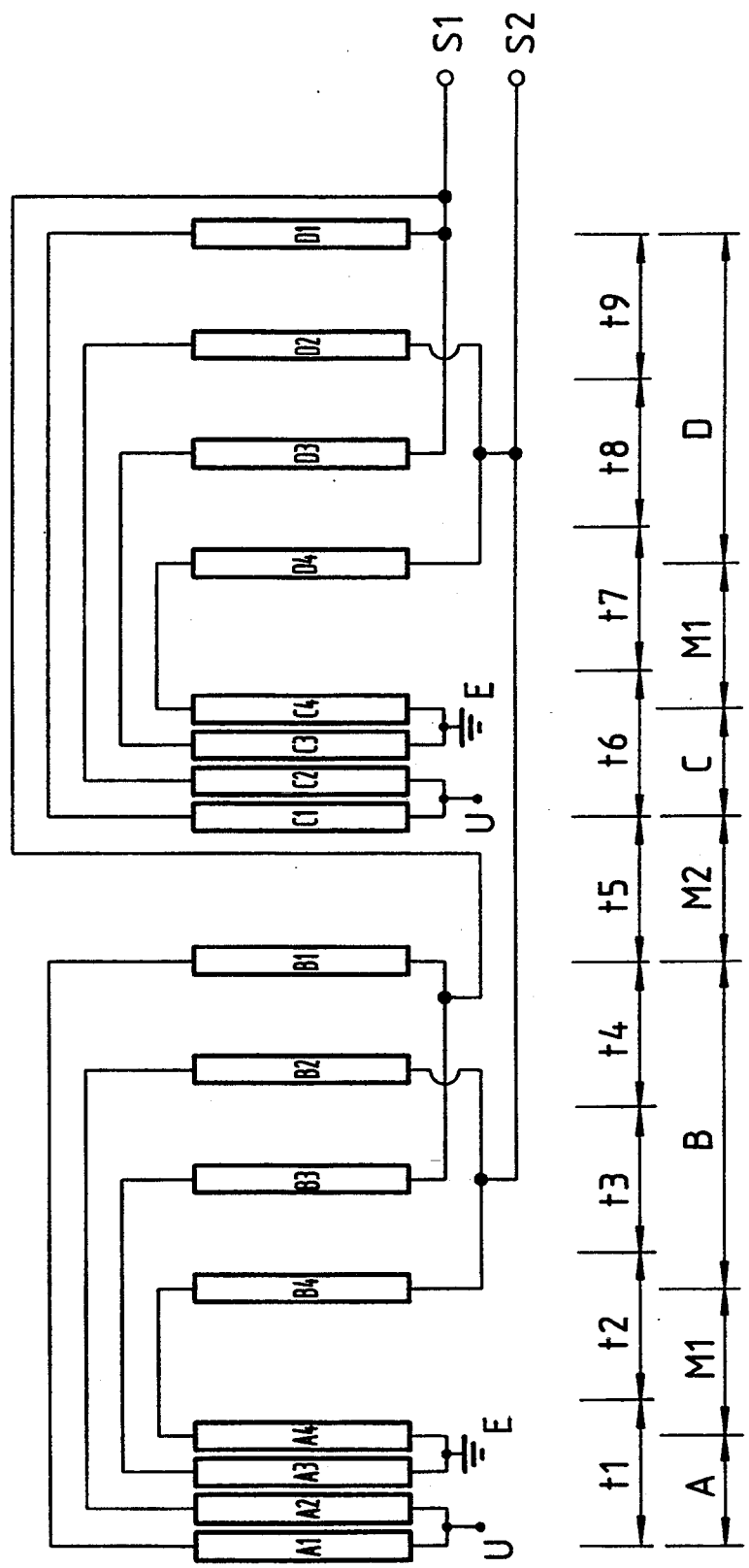
FIG. 2e illustrates the physical arrangement of a half-bridge circuit formed by four groups of magneto-resistive elements according to a third preferred embodiment.

FIG. 2e illustrates the physical arrangement of a half-bridge circuit formed by four groups of magneto-resistive elements arranged according to a third preferred embodiment. This embodiment is similar to that shown in FIG. 2a, however, a plurality of base arrangements are connected in parallel. The two base arrangements are separated by a distance M2 equal to t. The appropriate wiring of the magneto-resistive elements $A_n$, $B_n$, $C_n$ and $D_n$ into half bridges H1, H2, H3 and H4 is shown in FIG. 2f.

Figure 2F:
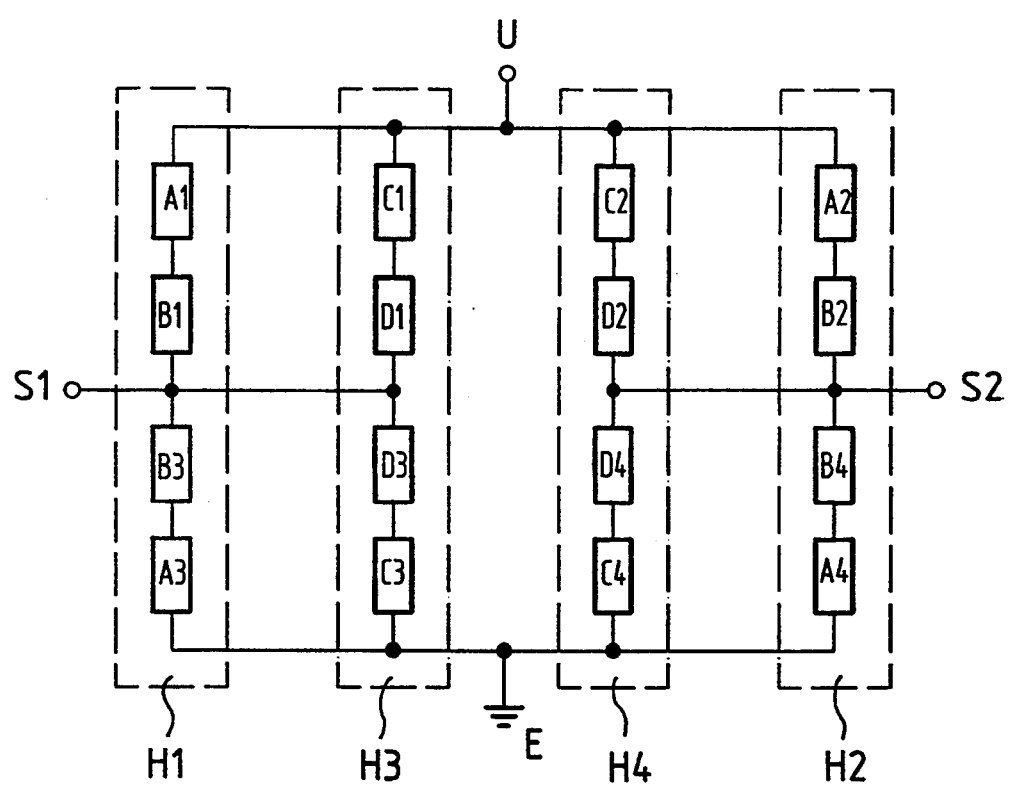
FIG. 2f is a circuit diagram of the arrangement shown in FIG. 2e.

Referring to FIG. 2f, it can be seen that additional half bridges H3 and H4 are formed, by the two groups of magneto-resistive elements $C_{1-4}$ and $D_{1-4}$. Half bridge H3 also provides the signal S1 with a phase relation of 0° and half bridge H4 provides the signal S2 with a phase relation of 90°. The magneto-resistive elements $C_{1-4}$ and $D_{1-4}$ in the second base arrangement are arranged within the half bridges H3 and H4 in the same manner as already extensively described with respect to the arrangement of the elements $A_n$ and $B_n$ of the first base arrangement as shown in FIGS. 2a and 2b and thus, no further explanation is needed. In a manner not shown it is also possible to connect in parallel more than two base arrangements. Alternatively, it is also possible to connect in series more than two base arrangements.

Figure 2G:
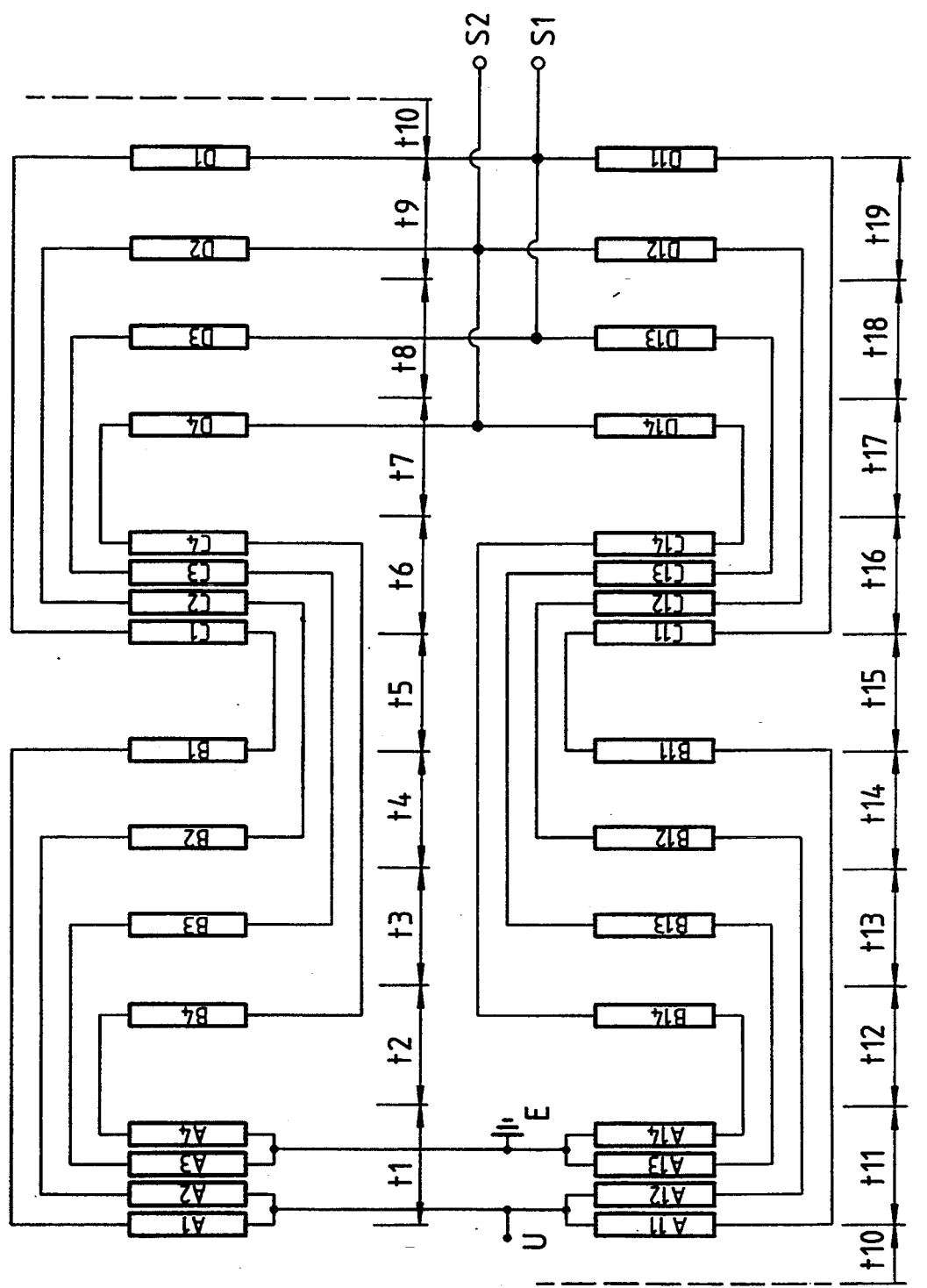
FIG. 2g illustrates the physical arrangement of a half-bridge circuit formed by eight groups of magneto-resistive elements according to a fourth preferred embodiment.
Figure 2H:
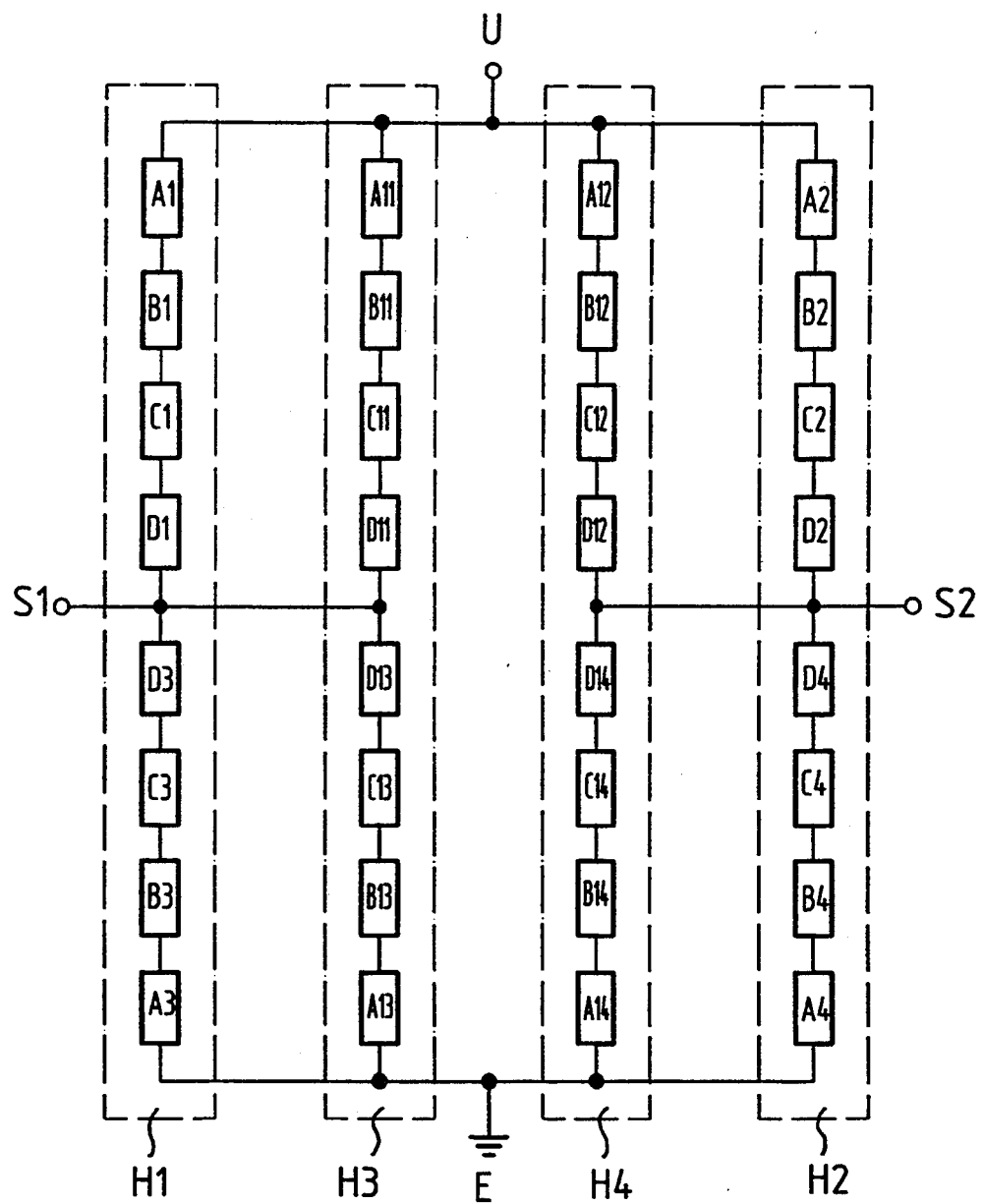
FIG. 2h is a circuit diagram of the arrangement shown in FIG. 2g.

FIG. 2g illustrates the physical arrangement of a half-bridge circuit formed by eight groups of magneto-resistive elements according to a fourth preferred embodiment. In particular, two series circuits as shown in FIGS. 2c and 2d have been connected in parallel. The elements of the additional series circuit are identified with the symbols $A_{1n}$ and $B_{1n}$, where n=1–4. The wiring for this arrangement is shown in detail in FIG. 2h. It can be seen that a further half bridge H3 is connected in parallel for generating the signal S1 of the first half bridge H1. In the same way half bridge H4 is connected in parallel for generating the signal S2 of the second half bridge H2. The distance between the two series circuits corresponds to one index period t.

In an analogous manner it is possible to connect in series a plurality of parallel circuits such as those shown in FIGS. 2e and 2f.

The magneto-resistive elements $A_n$ and $B_n$ of the base arrangements can also be connected to form full bridges, such as illustrated in FIGS. 3a–f hereinafter described.

Figure 3A:
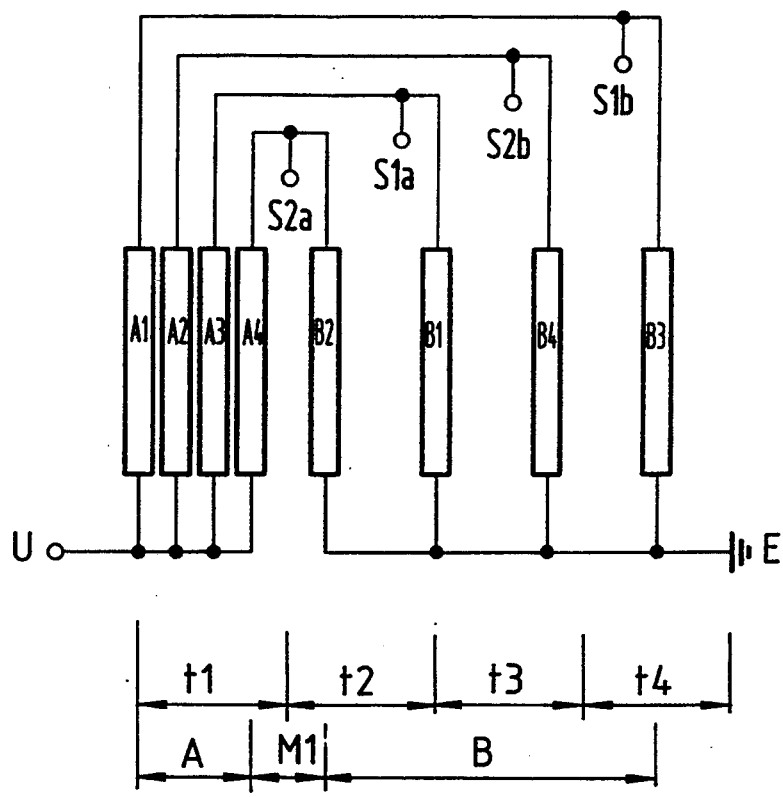
FIG. 3a illustrates the physical arrangement of a full-bridge circuit formed by two groups of magneto-resistive elements according to a fifth preferred embodiment.

FIG. 3a illustrates the physical arrangement of a full-bridge circuit formed by two groups of magneto-resistive elements according to a fifth preferred embodiment. The strip-shaped magneto-resistive elements $A_n$ and $B_n$ of the two groups A and B extend perpendicularly to the measuring direction X and are disposed parallel to each other in the measuring direction X. The four magneto-resistive elements $A_{1-4}$ of the first group A extend over the first index period t1 of the graduation 3 (not shown) and have a mutual phase shift of one quarter of the first index period with t1=t2=t3=tn=t. Thus, the first magneto-resistive element $A_1$ with the output signal of the phase relation of 0° is disposed at the first position "0"", the second magneto-resistive element $A_2$ with the output signal of the phase relation of 90° is disposed at the second position "90°", the third magneto-resistive element $A_3$ with the output signal of the phase relation of 180° is disposed at the third position "180°" and the fourth magneto-resistive element $A_4$ with the output signal of the phase relation of 270° is located at the fourth position "270°" of the first index period $t_1$.

The four magneto-resistive elements $B_{1-4}$ of the second group B are disposed in the adjoining index periods $t_2$, $t_3$ and $t_4$ of the graduation 3. The mutual distance between each magneto-resistive element $B_1$ to $B_4$ is $\frac{3}{4}(t)$. The distance M1 of the last element $A_4$ of the first group A from the first element $B_2$ of the second group B is $t/2$. Starting at the center M1 of both groups A and B, the Nth magneto-resistive element $A_n$ of the group A is electrically connected to the Nth magneto-resistive element $B_n$ of the other group B, where N=1 to 4.

Thus, the first (N=1) element of group A from the center, $A_4$, is connected to the first (N=1) element of group B from the center, $B_2$. The second (N=2) element of group A from the center, $A_3$, is connected to the second (N=2) element of group B from the center, $B_1$. Each element $A_n$ of the group A, however, is connected to the opposite-phase element $B_n$ of group B. Thus, element $A_4$ with the phase relation of 270° is electrically connected to element $B_2$ with the phase relation of 90°, element $A_3$ with the phase relation of 180° to element $B_1$ with the phase relation of 0°, element $A_2$ with the phase relation of 90° to element $B_4$ with the phase relation of 270°, and element $A_1$ with the phase relation of 0° to element $B_3$ with the phase relation of 180°. Because of this selected arrangement, the connecting lines between the elements $A_n$ of group A and elements $B_n$ of group B are free of crossings.

Figure 3B:
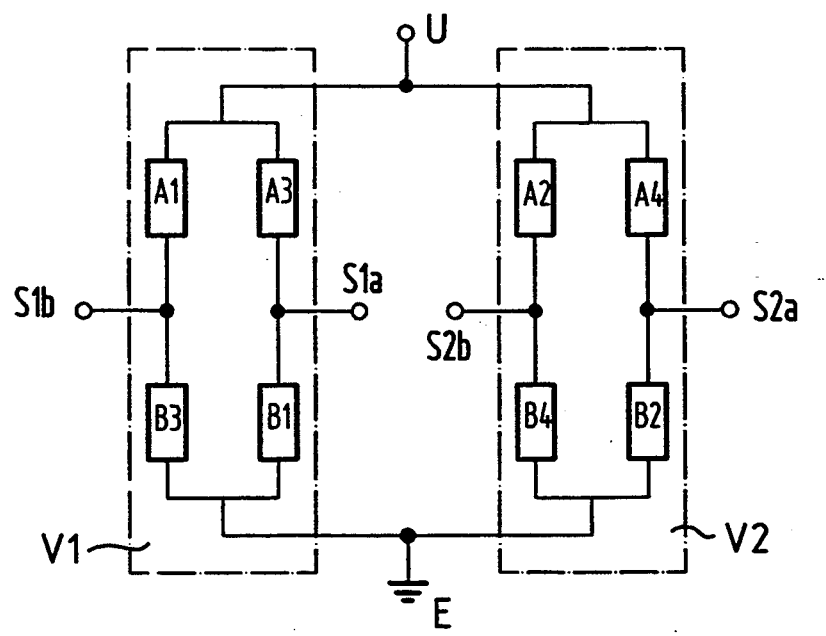

FIG. 3b is a circuit diagram of the arrangement shown in FIG. 3a. The element $A_1$ of the first group A with the phase relation of 0° forms an arm of a first half bridge, the element $B_3$ of the second group B with a phase relation of 180° is disposed in the second arm, the signal S1b with the phase relation 0° appears at the central tap. A second half bridge with the elements $A_3$ and $B_1$ is disposed parallel with this first half bridge. The opposite-phase element $A_3$ is disposed parallel with the element $A_1$ of the same group, and the opposite-phase element $B_1$ of the same group B parallel with the element $B_3$. The signals S1a and S2b, which are phase-shifted by 180° in relation to each other, are picked off at the central tap. Both half bridges form a full bridge V1 wherein a supply voltage U is connected to the elements $A_1$ and $A_3$ and ground E is connected to the elements $B_3$ and $B_1$.

A second full bridge V2 is disposed parallel with this first full bridge V1. It is constructed in the same manner as full bridge V1. The one half bridge is formed by the elements $A_4$ and $B_2$, the other half bridge by the elements $A_2$ and $B_4$. The signals S2a and S2b, which are phase-shifted by 180° with relation to each other, are picked off at the central taps. The phase relation of the elements $A_2$, $A_4$, $B_4$ and $B_2$, of the second full bridge V2 differs from the phase relation of the elements $A_1$, $A_3$, $B_3$ and $B_1$ of the first full bridge V1 by 90° so that the phase relation of the signals S1a and S1b also differs by 90° from the phase relation of the signals S2a and S2b.

In a similar manner as described with respect to the arrangements shown in FIGS. 2c–h, it is possible to connect a plurality of base arrangements to form series circuits, parallel circuits or combinations of series and parallel circuits.

Figure 3C:
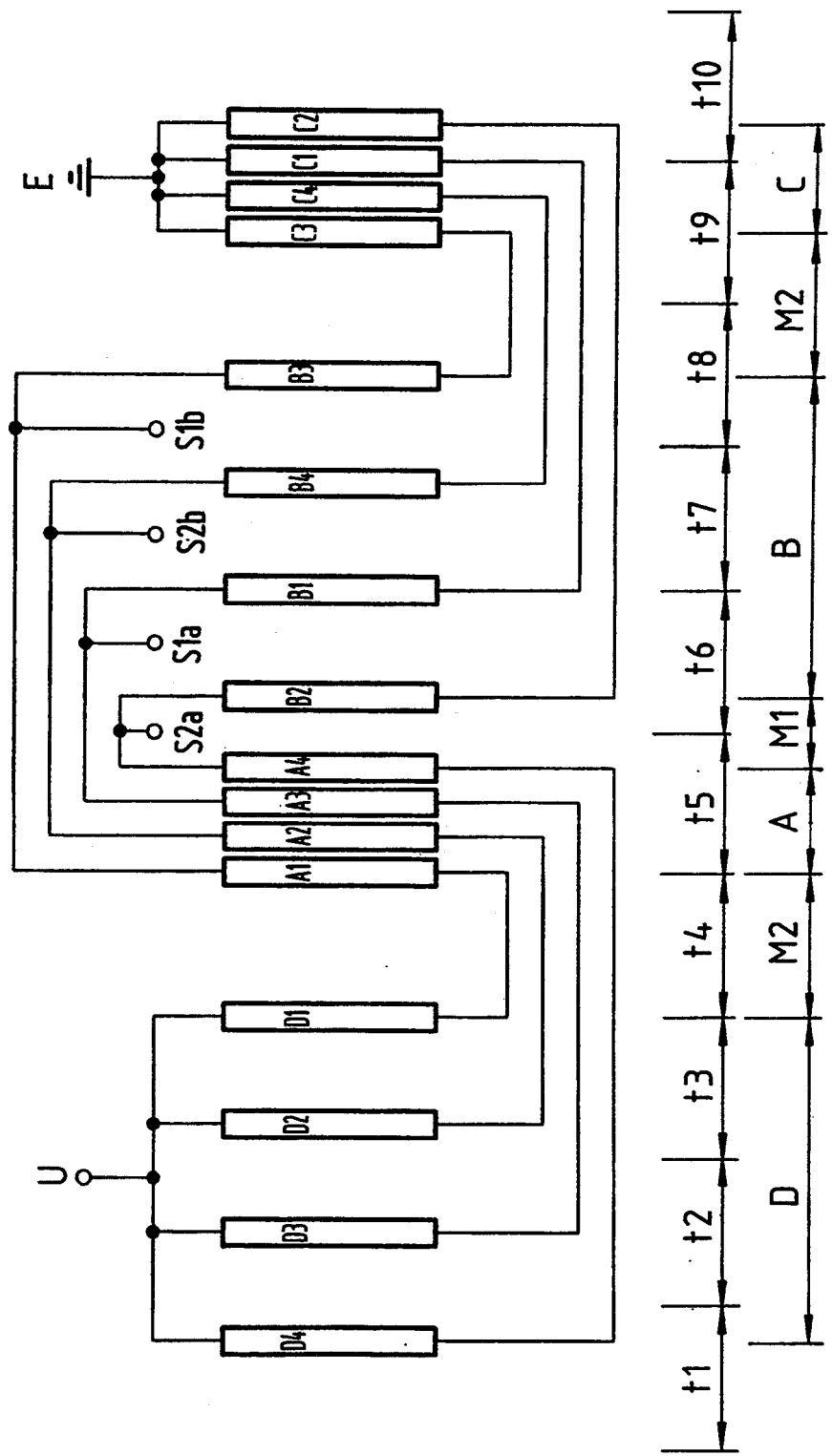
FIG. 3c illustrates the physical arrangement of a full-bridge circuit formed by two base arrangements as shown in FIG. 3a connected in series.
Figure 3D:
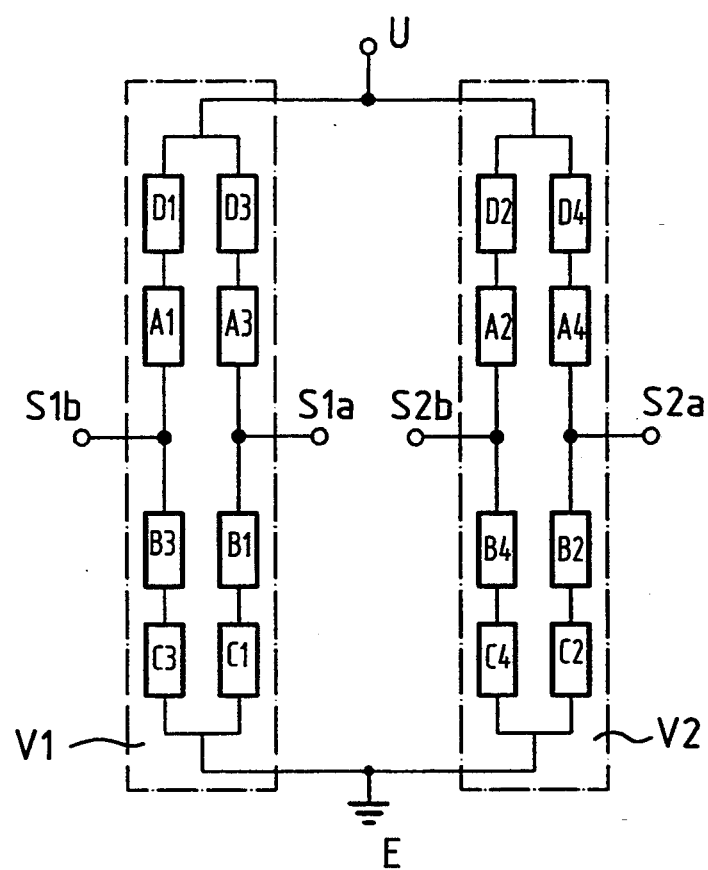
FIG. 3d is a circuit diagram of the arrangement shown in FIG. 3c.

FIG. 3c illustrates the physical arrangement of a full-bridge circuit formed by two base arrangements as shown in FIG. 3a connected in series. Looking in the measuring direction X, the first group C with the elements C of the second base arrangement is disposed next to the last element $B_3$ of the first base arrangement at a distance M2 of one index period to Each element $B_n$ of the one base arrangement is series connected with the respective same equiphase element $C_n$ of the other base arrangement so that the connection of elements $B_n$ with $C_n$ are free of crossings. In the same manner the second group D of the second base arrangement is disposed next to the elements $A_n$ of the first group A of the first base arrangement at the distance M2 of one index period to The equiphase elements of the two groups D and A are respectively series connected and free of crossings. FIG. 3d is a circuit diagram of the arrangement shown in FIG. 3c.

Figure 3E:
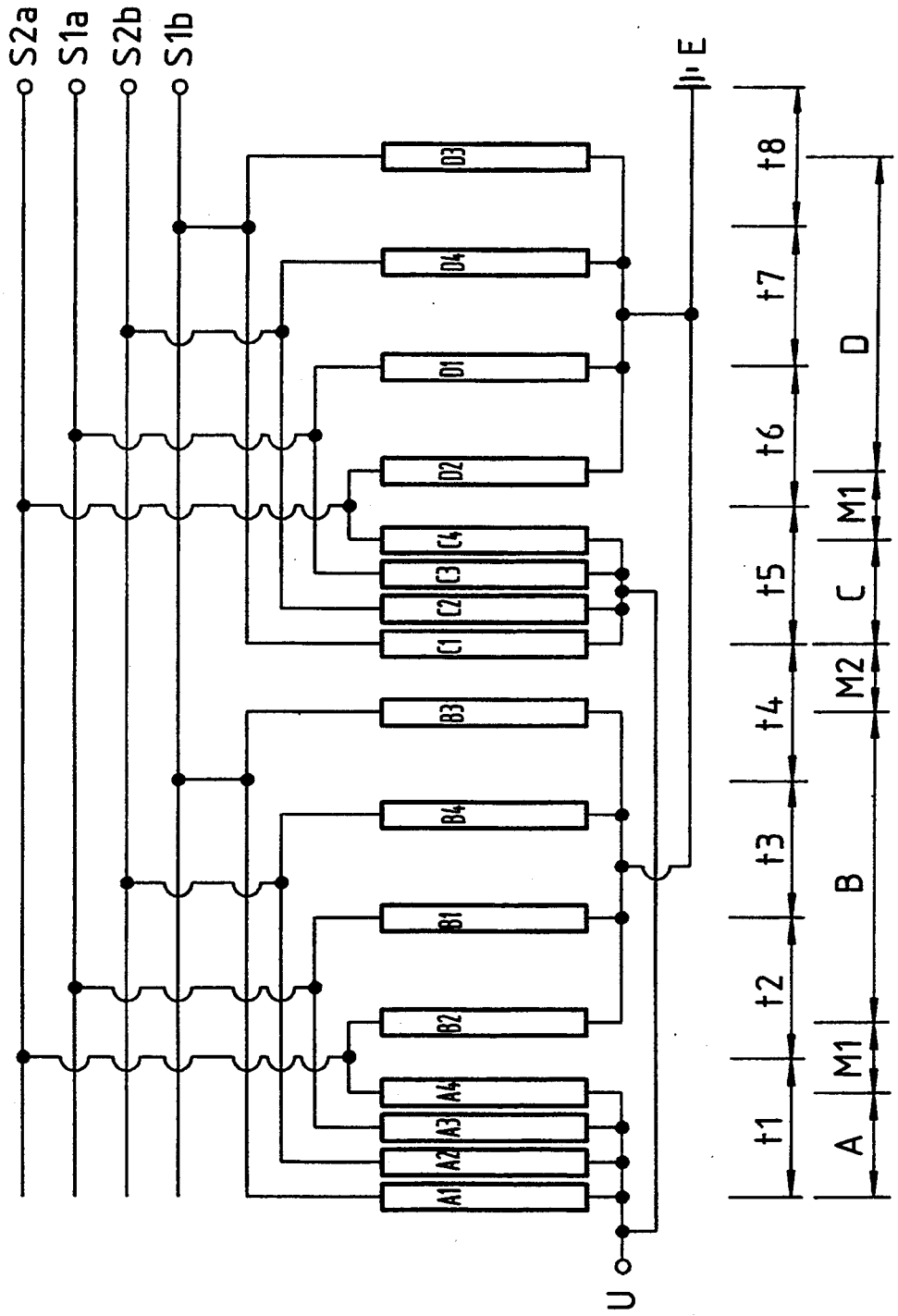
FIG. 3e illustrates the physical arrangement of a full-bridge circuit formed by two base arrangements as shown in FIG. 3a connected in parallel.
Figure 3F:
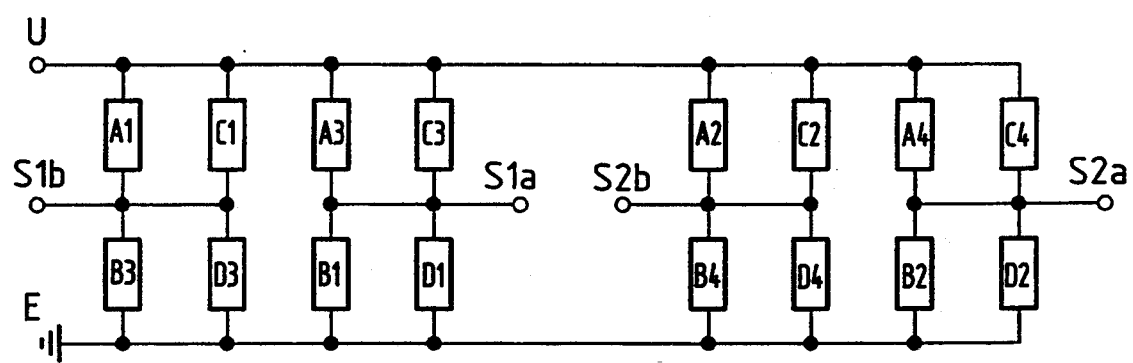
FIG. 3f is a circuit diagram of the arrangement shown in FIG. 3e.

A further option lies in connecting in parallel a plurality of base arrangements in accordance with FIGS. 3a and 3b. This arrangement is illustrated in FIGS. 3e and 3f. The two base arrangements are disposed next to each other at a mutual distance M2 of $t/2$. Similar signal taps are respectively connected to each other.

Combinations of series and parallel circuits analogous to the described bridge circuits are also possible.

To obtain two signals which are phase-shifted by 90° with respect to each other from the four signals S1a, S1b, S2a and S2b, the respectively opposite phase signals S1a, S1b and S2a, S2b are supplied to differential amplifiers. The outputs of the amplifiers S1 and S2 are phase-shifted by 90° with respect, to each other.

It is also possible to include more than four magneto-resistive elements in each group of the base arrangement. Such an arrangement may be used with all of the exemplary embodiments previously described.

The minimization of the amount of crossing of the connections of the magneto-resistive elements $A_n$ and $B_n$ of the group A with group B is essential. This is achieved through the physical layout of the magneto-resistive elements and particularly by the selected sequence of the elements $A_n$ and $B_n$. The connecting lines of these elements $A_n$ and $B_n$ have been placed in such a way that, starting at the center M1 of the groups A and B, the connecting lines of the Nth elements An and Bn extend closer to elements An and Bn than the connecting lines of the (N+1)th elements An and Bn, wherein all connecting lines extend parallel to each other.

The invention is not limited to the linear measuring system disclosed, it can also be used in connection with angular measuring systems. In this case the graduation and, if necessary, also the magneto-resistive elements for scanning the graduation are not disposed linearly, but on an arc of a circle or on a closed circle. When used with angular measuring systems, it is also possible in accordance with the invention to provide all-around scanning if the base arrangement with the magneto-resistive elements are disposed over the entire circumference.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A position measuring system for measuring the relative position of a first object with respect to a second object, the first object and second objects being movable with respect to each other, comprising:
   a periodic graduation located on the first object, the periodic graduation having an index period of t;
   a scanning unit located on the second object for scanning the periodic graduation, the scanning unit comprising;
      a first base arrangement facing the periodic graduation, the base arrangement including;
      a first group of at least four magneto-resistive elements, the first group spanning a distance no greater than the index period of the graduation;
      a second group of at least four magneto-resistive elements located adjacent to the first group, the second group spanning a distance greater than the index period of the graduation,
      the first and second groups separated by a predetermined distance so that a center point exists between the two groups; and
      a plurality of conductors for connecting elements of the first group to elements of the second group without crossing the conductors, wherein the Nth element of the first group is directly connected to the Nth element of the second group, where N represents the number element of the first and second groups from the center point.

2. A position measuring system according to claim 1 wherein the first group includes four magneto-resistive elements separated from each other by a distance substantially equal to one quarter of the index period and the second group includes four magneto-resistive elements separated from each other by a distance substantially equal to three quarters of the index period.

3. A position measuring system according to claim 1 wherein the elements of the first group connected to elements of the second group have the same phase relation with respect to the graduation and form a bridge arm of a half bridge and wherein the phase relation of the elements of one bridge arm of a half bridge circuit is phase shifted by t/2 with respect to the phase relation of the elements forming the other bridge arm and position-dependent output signals are taken at the connecting points of the bridge arms.

4. A position measuring system according to claim 2 wherein the elements of the first group connected to elements of the second group have the same phase relation with respect to the graduation and form a bridge arm of a half bridge and wherein the phase relation of the elements of one bridge arm of a half bridge circuit is phase shifted by t/2 with respect to the phase relation of the elements forming the other bridge arm and position-dependent output signals are taken at the connecting points of the bridge arms.

5. A position measuring system according to claim 1 further comprising a second base arrangement having the same configuration as the first base arrangement connected in series with the first base arrangement to form a series circuit wherein the first and second base arrangements are separated from each other in the measuring direction by one index period.

6. A position measuring system according to claim 5 wherein all elements of the first and second base arrangements having the same phase relation are connected in series and form one bridge arm of a half bridge.

7. A position measuring system according to claim 3 further comprising a second base arrangement having the same configuration as the first base arrangement connected in parallel with the first base arrangement wherein the first and second base arrangements are separated from each other in the measuring direction by one index period.

8. A position measuring system according to claim 5 further comprising a plurality of series circuits connected in parallel with one another.

9. A position measuring system according to claim 1 wherein the elements of the first group connected to elements of the second group have a phase relation of 180° with respect to each other.

10. A position measuring system according to claim 9 wherein the predetermined distance is one half an index period.

11. A position measuring system according to claim 9 wherein the elements of the first group connected to elements of the second group form a full bridge wherein at least four position-dependent output signals phase-shifted by 90° with respect to each other are output.

12. A position measuring system according to claim 2 wherein the elements of the first group connected to elements of the second group have a phase relation of 180° with respect to each other.

13. A position measuring system according to claim 12 wherein the predetermined distance is one half an index period.

14. A position measuring system according to claim 12 wherein the elements of the first group connected to elements of the second group form a full bridge wherein at least four position-dependent output signals phase-shifted by 90° with respect to each other are output.

15. A position measuring system according to claim 9 further comprising a second base arrangement having the same configuration as the first base arrangement connected in series with the first base arrangement to form a series circuit wherein the first and second base arrangements are separated from each other in the measuring direction by one index period.

16. A position measuring system according to claim 9 further comprising a second base arrangement having the same configuration as the first base arrangement connected in parallel with the first base arrangement wherein the first and second base arrangements are separated by one half of an index period.

17. A position measuring system according to claim 15 further comprising a plurality of series circuits connected in parallel.

18. A scanning unit for scanning a periodic graduation comprising:
   a first base arrangement facing the periodic graduation, the base arrangement including;
      a first base arrangement facing the periodic graduation, the base arrangement including;
      a first group of at least four magneto-resistive elements, the first group spanning a distance no greater than the index period of the graduation;
      a second group of at least four magneto-resistive elements located adjacent to the first group, the second group spanning a distance greater than the index period of the graduation,
      the first and second groups separated by a predetermined distance so that a center point exists between the two groups; and
      a plurality of conductors for connecting elements of the first group to elements of the second group without crossing the conductors, wherein the Nth element of the first group is directly connected to the Nth element of the second group, where N represents the number element of the first and second groups from the center point.

19. A position measuring system according to claim 18 wherein the first group includes four magneto-resistive elements separated from each other by a distance substantially equal to one quarter of the index period and the second group includes four magneto-resistive elements separated from each other by a distance substantially equal to three quarters of the index period.

20. A position measuring system according to claim 18 wherein the elements of the first group connected to elements of the second group have the same phase relation with respect to the graduation and form a bridge arm of a half bridge and wherein the phase relation of the elements of one bridge arm of a half bridge circuit is phase shifted by t/2 with respect to the phase relation of the elements forming the other bridge arm and position-dependent output signals are taken at the connecting points of the bridge arms.

* * * * *